No. 757,407. PATENTED APR. 12, 1904.
L. MAYHALL.
FISH CULTURE TANK.
APPLICATION FILED JAN. 2, 1904.
NO MODEL.
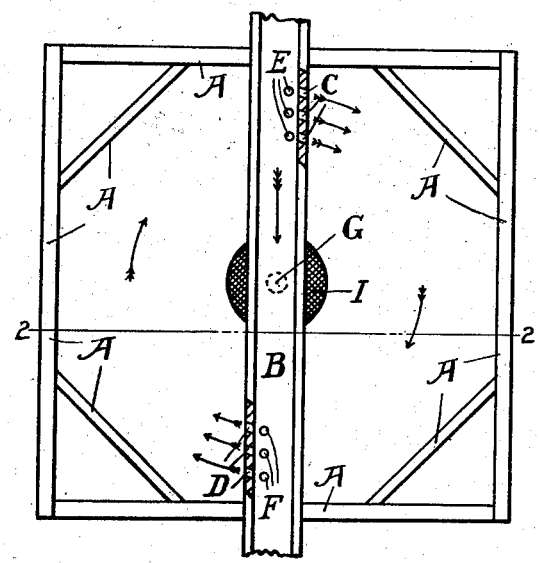
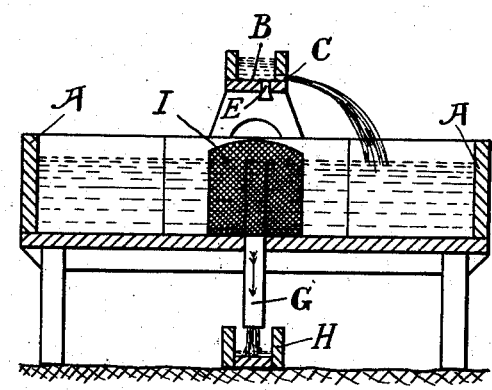
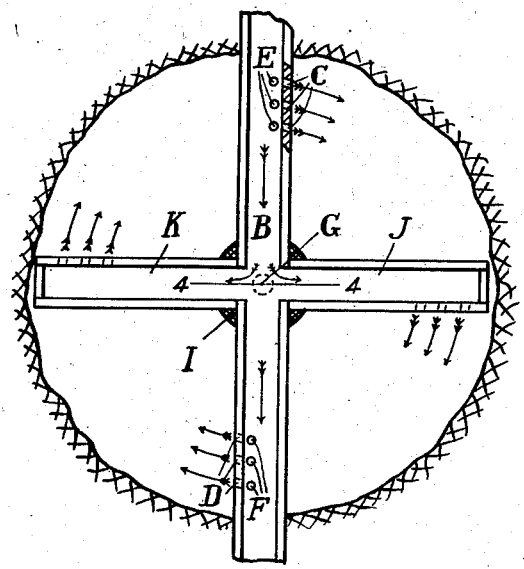
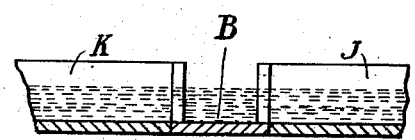
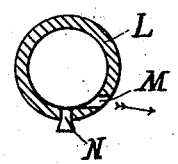
WITNESSES:
INVENTOR:
Larken Mayhall
BY
ATTORNEY.

No. 757,407. Patented April 12, 1904.

UNITED STATES PATENT OFFICE.

LARKEN MAYHALL, OF SULTAN, WASHINGTON.

FISH-CULTURE TANK.

SPECIFICATION forming part of Letters Patent No. 757,407, dated April 12, 1904.

Application filed January 2, 1904. Serial No. 187,546. (No model.)

*To all whom it may concern:*

Be it known that I, LARKEN MAYHALL, a citizen of the United States of America, and a resident of Sultan, in the county of Snohomish and State of Washington, have invented certain new and useful Improvements in Fish-Culture Tanks, of which the following is a specification.

My invention relates to devices for supplying water to fish-culture tanks and ponds, and has for its objects the supplying of water in such a manner as to produce a complete circulation and thorough aeration of the water and to discharge the water in such a manner as to avoid injuring the young fish by drawing them against the netting surrounding the outlet of said tanks and ponds, and, further, to prevent the said netting from becoming clogged up with the refuse as easily as it does at present. I attain these objects by the devices illustrated in the accompanying drawings, in which—

Figure 1 is a plan showing one of my culture-tanks. Fig. 2 is a section thereof on the line 2 2 in Fig. 1. Fig. 3 is a plan of a modified form of my device applied to a culture-pond. Fig. 4 is a section of the supply-pipe on the line 4 4 in Fig. 3. Fig 5 is a section of a pressure water-supply pipe, showing the outlet-holes therein.

Similar letters of reference refer to similar parts throughout the several views.

In the usual methods of supplying water to culture tanks and ponds great difficulty is experienced in producing the desired circulation and aeration, first, by reason of the great volume of water necessary to produce a desired circulation by the usual method of a direct supply and discharge; second, by reason of the inability to sufficiently disturb the surface of the water to produce a thorough aeration in the usual method of a direct or smooth channel-supply; third, by reason of the injuries to the young fish in being drawn against the netting surrounding the outlets in the usual methods of direct discharge, and, fourth, by reason of the clogging of the netting with refuse and the consequent overflowing of the tank or pond, whereby great loss of fish is occasioned in the usual method of direct discharge.

In my device the water is admitted into the tank or pond from an elevation or from pressure-pipes, whereby I obtain a power which I am able to use either for producing a revolving current or to disturb and aerate the water, or I may use it for both of these purposes at the same time. I discharge the water at the center of the tank or pond, the outlet being surrounded by the usual netting or screen. Since the water has a circular motion around the central outlet and screen, it has no tendency to draw the fish against the screen, because the direction of the current is not at right angles to the screen, but is nearly parallel or concentric therewith. The water being under a circular motion and the current being so nearly parallel with the central screen, the refuse in the tank or pond will be carried round and round the screen, thereby keeping it open and free for the discharge of the water through the central outlet-pipe and greatly lessening the danger of overflow and the losses consequent therefrom.

Referring now to the drawings, the tank is indicated with eight sides A, and the water-supply-trough B is represented as passing directly over the center of the tank. In the sides of the supply-trough B are made the series of holes C on one side of the center of the tank and D on the other side of the center of the tank. In the bottom of the trough B are made the corresponding series of holes E and F. The holes C are indicated on the left side of the stream of water in the trough, while the holes D are on the right side thereof, and the holes E and F open directly downward. The motion of the water in the tank resulting from the supply of water through the holes C and D is circular, and its direction of rotation, due to the direction of the streams from these holes, is known as "clockwise;" but the action of the water supplied through the holes E and F is aeration by means of agitation and by means of the air-bubbles carried into the tank-water by the water from these holes. The holes C and D are preferably inclined, so as to throw the streams issuing therefrom in a direction practically tangential to the circle at the point where the falling water meets the tank-water. The effect of this is to produce the circular movement of the water more easily, for if the streams were emitted from the trough B at right angles thereto the water would first travel straight to the side and would interfere with the circular motion, whereas by thus inclining the streams they are brought into line with the circular stream of the tank. The series of holes C and D are so designed in size as to supply the desired amount of water to the tank. The holes E and F are made of the same size as the holes C and D, so that it is possible to stop up one or more holes in the series C and D and to open a corresponding number of holes in the series E and F without changing the amount of water supplied to the tank, but controlling the strength of the rotary current in the tank and the amount of agitation of the water.

The outlet-pipe C is shown in the center of the tank emptying into the waste-trough H, under the tank. The pipe G is surrounded by the usual netting or screen I.

The form shown in Fig. 3 shows my system as applied to a fish-culture pond or very large tank, in which it is advisable to have the streams entering the pond at four or more places instead of at two, as described. In this case I prefer to construct the branch troughs J and K, leading from the main supply-trough B from the center of the tank, at right angles to said trough B. These troughs J and K are similar to the trough B except that their ends are closed, and the entire water in them flows through the holes placed in their sides and bottoms in exactly the same way that it flows through the holes C, D, E, and F, as already described. These troughs have the same level as the trough B.

In cases where it is preferable to supply water to my system by means of pipes or what is generally known as the "pressure" system I prefer to construct my supply-pipe of wood or iron, as shown in Fig. 5. The supply-pipe L would take the place of the trough B, and the holes M and N the places of the holes C and E. In this case the holes M may be placed either at the center of the pipe or, as shown, at the bottom thereof.

The regulation of the flow of water through the various holes in my device is most simply effected by the insertion of a plug of wood or iron into the hole which it is desired to close or the withdrawal of such a plug from the hole which it is desired to open.

Having now described my invention, what I claim, and desire to secure by Letters Patent, is—

1. In a fish-culture tank, the combination with a central water-outlet pipe and protecting-screen therefor, of inlet-streams of water arranged to produce a rotary motion of the water in the tank around said outlet-pipe.

2. In a fish-culture tank, the combination with a central water-outlet pipe and protecting-screen therefor, of inlet-streams of water arranged to produce a rotary motion of the water in the tank around said outlet-pipe, and of inlet-streams of water arranged to agitate and aerate the water in said tank.

3. In a fish-culture tank, the combination with a central water-outlet pipe and protecting-screen therefor, of a supply-pipe producing inlet-streams of water in directions substantially tangential to the rotary motion of the water in said tank.

4. In a fish-culture tank, the combination with a central water-outlet pipe and protecting-screen therefor, of a supply-pipe producing inlet-streams of water in directions substantially tangential to the rotary motion of the water in said tank, and other streams of water in vertical direction therefrom and adapted to agitate and aerate the water in said tank.

5. In a fish-culture tank, the combination with a central water-outlet pipe and protecting-screen therefor, of a supply-pipe having holes therein adapted to throw streams of water into said tank said holes being inclined so as to cause said streams to meet the water in the tank in a direction substantially tangential to the motion of the water.

6. In a fish-culture tank, the combination with a central water-outlet pipe and protecting-screen therefor, of a supply-pipe having holes therein adapted to throw streams of water into said tank some of said holes being inclined so as to cause the streams therefrom to meet the water in the tank in a direction substantially tangential to the motion of the water, and the other holes therein being directed downward so as to cause the streams therefrom to agitate and aerate the water in the tank.

Signed at Tacoma, Washington, this 10th day of December, 1903.

LARKEN MAYHALL.

Witnesses:
W. R. FLASKETT,
FREDERICK J. LARSON.